US009119046B2

(12) United States Patent  
Masteika

(10) Patent No.: US 9,119,046 B2  
(45) Date of Patent: Aug. 25, 2015

(54) CONNECTION ATTEMPT NOTIFICATION

(71) Applicant: TeliaSonera Ab, Stockholm (SE)

(72) Inventor: Marijus Masteika, Kaunas (LT)

(73) Assignee: TELIASONERA AB, Stockholm (SE)

( * ) Notice: Subject to any disclaimer, the term of this patent is extended or adjusted under 35 U.S.C. 154(b) by 227 days.

(21) Appl. No.: 13/868,160

(22) Filed: Apr. 23, 2013

(65) Prior Publication Data

US 2013/0281066 A1  Oct. 24, 2013

(30) Foreign Application Priority Data

Apr. 23, 2012  (EP) .................................... 12165145

(51) Int. Cl.
*H04W 4/16* (2009.01)
*H04W 4/14* (2009.01)
*H04M 1/725* (2006.01)
*H04W 8/18* (2009.01)
*H04W 8/24* (2009.01)

(52) U.S. Cl.
CPC ........ *H04W 4/16* (2013.01); *H04W 4/14* (2013.01); *H04M 1/72547* (2013.01); *H04W 8/18* (2013.01); *H04W 8/245* (2013.01)

(58) Field of Classification Search
CPC ................................. H04W 4/16; H04W 4/14
USPC .................... 455/412.1–414.3, 415–417, 466
See application file for complete search history.

(56) References Cited

U.S. PATENT DOCUMENTS

| 6,799,017 | B1 | 9/2004 | Kregel |
| 2002/0087584 | A1 | 7/2002 | Hung |
| 2002/0094811 | A1 * | 7/2002 | Bright et al. ................... 455/433 |
| 2004/0213208 | A1 * | 10/2004 | Baratz et al. ................... 370/352 |
| 2005/0250493 | A1 * | 11/2005 | Elkarat et al. ............... 455/432.1 |
| 2007/0293216 | A1 * | 12/2007 | Jiang ............................. 455/433 |

FOREIGN PATENT DOCUMENTS

| EP | 2 099 204 | 9/2009 |
| WO | 2004/110039 | 12/2004 |

OTHER PUBLICATIONS

European Search Report dated Jun. 18, 2012, corresponding to the Foreign Priority Application No. 12 16 5145.

* cited by examiner

*Primary Examiner* — Kashif Siddiqui
(74) *Attorney, Agent, or Firm* — Young & Thompson

(57) ABSTRACT

A method for notifying a user of a mobile terminal of one or more missed connection attempt in a mobile communication network, wherein at least one unsuccessful connection attempt is detected in a network element. Information on at least one unsuccessful connection attempt is at least temporarily stored in the network element. The information from at least one connection attempt is retrieved in the network element and a predetermined notification message including information on at least one missed connection attempt is created. The notification message is delivered in the network. Additionally, a network element for implementing the method is described.

11 Claims, 2 Drawing Sheets

CONNECTION ATTEMPT NOTIFICATION

TECHNICAL FIELD

The invention concerns in general the technical field of telecommunications. Especially, the invention concerns the notification of a user of missed connection attempt.

BACKGROUND OF THE INVENTION

The development of mobile communication technologies has enabled the permanent reachability of a user of a mobile terminal. However, if the topic is considered other way around, the user of the mobile terminal may not necessarily be able to take the calls, or any other connection attempts, all the time. There are several reasons why the user may miss call attempts. Namely, a) the mobile terminal can be switched off, b) the mobile terminal can be out of radio network coverage, c) the user of the mobile terminal may be busy (e.g. the user is already having a call), or d) the user of the mobile terminal is not able to answer the call.

In order to keep the user informed of missed call, or connection, attempts the mobile terminal manufacturers have implemented a call register in the device. The call register typically maintains information on missed calls, received calls and dialed numbers, for example. The missed calls section of the call register collects information of call attempts which were not answered by the user of the mobile terminal for one reason or another. Especially, the missed calls section collects information if the call attempt signal has reached the mobile terminal from the network. This is the case, when the user of the mobile terminal is not able to answer the call or if the called party drops the call prior answer, as an example.

In addition to call registers the user of the mobile terminal may get information on the missed call attempts from the telecom operator if the user has activated such a service. The idea behind the service is that a network node collects information on missed calls in the network and when the mobile terminal can again be reached, the information is transmitted to the mobile terminal. The information is delivered by means of a regular short message (SMS). This kind of service fits for use if the mobile terminal is switched off or if the mobile terminal is out of the radio network coverage when the call attempt is done or if the mobile terminal is busy with another call (provided that call waiting function is not activated).

However, the use of regular short messages may be annoying for some users. Let's consider, for example, a sales person receiving huge amount of calls all the time, when the person is driving in a scattered radio network coverage area with his or her car. When the sales person is out of radio coverage the missed calls are collected in the network. And when the sales person enters to an area with radio coverage, he or she receives a regular notification SMS of the missed calls. The person receives is able to receive call until the radio coverage again ends and again the missed calls are collected in the network and information on them are delivered to the person when he again enters to an area with radio coverage. One can directly see the disadvantage of such a solution and understand the dissatisfaction of the user of such a service. Furthermore, the safety aspect, especially when driving a car, is also an issue in the regular SMS based prior art solution, since the sales person would, for sure, read each of the received SMS when driving.

The challenge in improving the solution as described above is that the information on the missed connection attempts shall be delivered to the mobile terminal in such a manner that the mobile terminal is able to detect that the delivered information contains missed connection attempt information. Further, it is a challenge, how to present the missed connection attempt information to the user of the mobile terminal.

SUMMARY OF THE INVENTION

An objective of the invention is to present a method and a network element for notifying a user of a mobile terminal of at least one missed connection attempt in a manner that is convenient for the user. Another objective of the invention is that the method and the network element for notifying the user of missed call attempts provides a similar user experience to existing call registers implemented in the mobile terminals. The objects of the invention are reached by a method and a network element as defined by the respective independent claims.

According to a first aspect, a method for notifying a user of a mobile terminal of one or more missed connection attempt in a mobile communication network is provided, wherein the method comprises the steps of detecting at least one unsuccessful connection attempt in a network element, storing information on at least one unsuccessful connection attempt at least temporarily in the network element, retrieving information from at least one connection attempt in the network element and creating a predetermined notification message comprising information on at least one missed connection attempt in the network element, and delivering the notification message in the network.

The creation of the notification message may comprise a further step of setting an indicator to indicate that the notification message comprises information on at least one missed connection attempt. The indicator may be defined in a transfer protocol identifier field.

The creation of the notification message may also comprise a further step of defining the caller of the missed connection attempt as a sender of the notification message. A Mobile Subscriber Integrated Services Digital Network Number may be used for defining the caller of the missed connection attempt as a sender of the notification message.

Information on the time of missed connection attempt may be added in the notification message by a Short Message Service Centre. The time of missed connection attempt may be expressed in a transfer protocol service centre time stamp parameter (TP-Service-Centre-Time-Stamp).

Alternatively or in addition, the creation of the notification message may comprise a further step of inserting information at least on the caller of the missed connection attempt and time of missed connection attempt in the content part of the notification message.

According to a second aspect, a network element configured to notify a user of a mobile terminal of one or more missed connection attempt in a mobile communication network is provided. The network element comprises a processor and memory including computer program code wherein the memory and the computer program code configured to, with the processor, cause the network element at least to perform a detect at least one unsuccessful connection attempt in a network element, store information on at least one unsuccessful connection attempt at least temporarily in the network element, retrieve information from at least one connection attempt in the network element and create a predetermined notification message comprising information on at least one missed connection attempt in the network element, and deliver the notification message in the network.

The network element may be configured to, during the creation of the notification message, set an indicator to indicate that the notification message comprises information on at least one missed connection attempt. The network element may also be configured to define the indicator in a transfer protocol identifier field.

The network element may be configured to, during the creation of the notification message, define the caller of the missed connection attempt as a sender of the notification message. The network element may be configured to use a Mobile Subscriber Integrated Services Digital Network Number for defining the caller of the missed connection attempt as a sender of the notification message.

The network element may also be configured to, during the creation of the notification message, insert information at least on the caller of the missed connection attempt and time of missed connection attempt in the content part of the notification message.

The exemplary embodiments of the invention presented in this patent application are not to be interpreted to pose limitations to the applicability of the appended claims. The verb "to comprise" is used in this patent application as an open limitation that does not exclude the existence of also un-recited features.

The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

The term 'caller' here refers to a party who initiates a communication connection attempt towards another party. The term 'recipient' here refers to a party, who is the target of the communication connection attempt. Both of the terms shall be considered as describing a party with necessary communication equipment in order to initiate and receive a communication connection.

Figure 1:
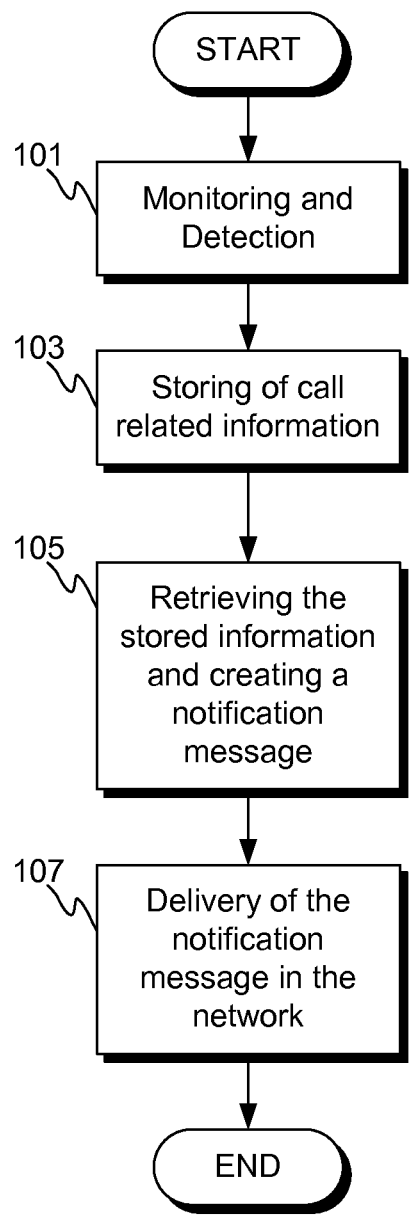
FIG. 1 illustrates a method according to an embodiment of the invention.

In order to understand the invention it is necessary to describe the call set-up procedure shortly by referring to FIG. 1. Namely, the caller initiates the call connection by dialing the recipients number i.e. MSISDN (Mobile Subscriber Integrated Services Digital Network Number) by means of his or her terminal device. The network of the caller identifies the network (PLMN) into which the dialed MSISDN belongs to and locates a GMSC (Gateway Mobile Switching Centre) for that network. The GMSC is a network node enabling the interaction of the networks.

As the GMSC receives an Initial Address message comprising the MSISDN of the recipient, the MSC in question forwards the MSISDN information to the HLR (Home Location Register) and requests routing information for it. The HLR is a central database that contains details of each mobile terminal subscriber that is authorized to use the core network. The HLR is configured to look up the MSISDN and determine the IMSI (International Mobile Subscriber Identity) and the SS7 address for the MSC/VLR (Visitor Location Register) that is serving the mobile terminal. SS7 is a set of telephony signaling protocol used to set up and tear down telephone calls.

The HLR is configured to contact the serving MSC/VLR and request it to assign a Mobile Station Routing Number (MSRN) to the call. In response to that the MSC/VLR allocates the MSRN and forwards it to the HLR. The HLR is configured to forward the MSRN as well as routing information for the serving MSC/VLR to the GMSC. The GMSC delivers an Initial Addressing message to the serving MSC/VLR and uses the MSRN to route the call to the MSC/VLR. Once the serving MSC/VLR receives the call, the MSRN can be released and may be made available for reassignment.

The serving MSC/VLR initiates paging of the mobile terminal through the radio access network. If the mobile terminal responds to the paging by sending a channel request, the final steps, such as authentication, for setting up the call can be performed and thus the call can be established.

Naturally, if the caller belongs to the same network as the recipient, the MSISDN of the recipient is directly managed by one or more MSCs (Mobile Switching Centre) within the network and the recipient can be found from the same network as the caller. Thus, the process becomes simpler than described above.

All in all, if the mobile terminal is switched off or the mobile terminal is out of the radio network coverage (from the last known location area), the paging will not be successful.

According to the present invention it is monitored and detected 101 that the mobile terminal cannot be reached from the network and an unsuccessful connection attempt has occurred. The unsuccessful connection attempt information may be stored 103 at least temporarily in the network node itself or to any other network node coupled to it. According to an embodiment the stored information comprises at least the phone number of the caller and time of the call. Furthermore, the information may also comprise the phone number of the called party and/or the number of missed calls per caller.

The actual network entity collecting information on the missed connection attempts may be the MSC, which is serving the mobile terminal. Alternatively, the MSC may redirect any communication attempt through another network node, such as a server, which is configured to collect the caller related information if the connection cannot be established. According to still further embodiment, the MSC may collect the information on the unsuccessful connection attempt, but deliver the information to another network node for further use.

Next, information from the connection attempt is retrieved in the network element and a notification message that is to be delivered to the called party is created 105. The information to be delivered in the message is composed in a predetermined format. An identifier is included in the message to inform that the message contains information on missed connection attempts. Further, the created notification message at least contains information on the caller, such as MSISDN number of the caller, and also information on the time of call. Also, the number of connection attempts per a caller can be included in the message.

The notification message, such as a SMS message, is to be delivered 107 to the called party when it is detected that the mobile terminal is again available in the network i.e. it is switched on or it is again residing within radio network coverage. Alternatively or in addition, the notification message can be sent immediately to the called party if the reason for unsuccessful call attempt is that the call connection to the MSISDN number in question was busy. In order to deliver the message to the recipient in such a manner that the delivery disturbs the recipient as little as possible, the message can be classified as a service message. The service message indicates that the message shall not be handled as regular SMS, i.e. shall not be displayed to the recipient. Actually, according to the invention the service message as such is not necessarily intended for the user as such, but merely to the call register application in the mobile terminal. The call register application is configured to detect, on basis of the identifier, that the received message is a notification message of at least one missed connection attempt, such as a call. In response to the detection that the received message is a notification message of missed connection attempt the call register application in the mobile terminal is configured to retrieve the information included in a predetermined format in the message into the call register application. This causes the call register to update its information with the information included in the notification message. As a result information on one or more missed call attempts are delivered to the mobile terminal and can be seen similarly as the any other missed call information in the missed call register. The call register mentioned is typically implemented by the terminal manufacturer or the operating system manufacturer, but may also be an additional application, which is downloaded into the terminal by the user.

As discussed above, the notification message comprises an identifier, which indicates that the message, such as SMS, comprises information relating to a missed connection attempt. According to the invention the identifier may be included in a transfer protocol as a so called protocol identifier. In such a case a certain value in the protocol identifiers is reserved for indicating that the message is a notification message consisting of information on at least one missed connection attempt. An example of such a protocol identifier may be a TP-Protocol-Identifier (TP-PID), which is an information element, by which the SMS transfer layer may refer to a higher layer protocol being used, or indicating interworking with a certain type of telematics device. TP-PID consists of one octet and the bits may be used to different purposes in order to indicate the device/service into which the short message in question is intended to. Examples of such devices/services, which already exist, are telefaxes, teletex, Internet Electronic Mail and so on. According to some embodiments of the invention a specific value for TP-PID may be determined for indicating that the delivered message is a service message comprising information on at least one missed connection attempt.

According to some embodiment of the invention the time of missed connection attempt may be delivered to the mobile terminal by utilizing so called Transfer Protocol Service Centre Time Stamp (TP-SCTS). This is possible in such a manner that when the network recognizes the missed connection attempt it composes the notification message and delivers the message to the Short Message Service Centre (SMSC), which gives TP-SCTS to the message. Thus, the mobile terminal receives the time stamp information, which may be interpreted as indicating the time of missed calls at the receiving end, e.g. by the call register of the mobile terminal.

Furthermore, the caller's information is delivered to the mobile terminal in such a manner that the network element composing the notification message is configured to add information on the party, who initiated the missed connection attempt, to the sender information of the notification message. At the receiving end this information is retrieved from the notification message by e.g. the call register application of the mobile terminal.

Based on the three information elements as described above, namely the identifier indicating that the message is a notification message of missed connection attempts, time stamp and information of the caller of the missed connection attempt it is possible to create a data entry to the call register of the mobile terminal for indicating any of the missed connection attempts occurred during unavailability of the subscriber.

According to another embodiment of the invention a missed connection attempt application may be installed in the mobile terminal. The application is configured to interact towards the network through the radio communication means of the mobile terminal and towards the call register application in the mobile terminal. The missed connection attempt application may receive information from the network that the user of the mobile terminal has missed certain connection attempts when the mobile terminal was unavailable or busy to the network. The missed connection attempt application is configured to detect that a notification message is intended to it by recognizing an identifier in the notification message. As the missed connection attempt application recognizes the identifier it is configured to retrieve information composed in the message and to initiate a communication with a call register residing in the mobile terminal and transfer the information composed in the notification message to the call register. According to some embodiment of the invention the the in the notification message is in a predetermined format. Thus, the missed connection attempt application is directly capable of transferring information in the message to a corresponding data field in the call register. For example, the message may comprise information on the phone number of the caller and the time of call, the missed connection attempt application may transmit the phone number to the corresponding data field in the call register as well as the time stamp. The method in accordance with an embodiment of the invention may comprise a step of retrieving caller's name from the phone book of the mobile terminal on the basis of the phone number before transferring the information to the call register. Some other embodiment may comprise a procedure that the missed connection attempt application transfers the caller information to the call register and triggers the call register to check if there is a match between the phone number transferred to the call register with an entry stored in the phone book of the mobile terminal. If a match is found, the phone number is replaced with a corresponding name in order to provide the user a most satisfying user experience. Furthermore, the missed connection attempt application may trigger a setup of an indicator, such as an icon, to be given to the user to make the user to notify that he or she has missed one or more connection attempts.

The information on the missed connection attempts may be delivered as a special type of SMS to the missed connection attempt application residing in the mobile terminal. As said the notification message may comprise an indicator to be recognized as comprising information on missed connection attempts. According to another embodiment the missed connection attempt application is configured to communicate with the network over a data connection. This enables a communication which does not bother the user of the mobile terminal due to the fact that the information can be delivered to the mobile terminal without recognized by the user. In response to the receipt of the information the missed connection attempt application may process the data as described above.

Some aspects of the invention relate to a detection of the type of the mobile terminal before the delivery of the notification message into the mobile terminal. The missed connection attempt application may be configured to derive, in the mobile terminal, the type of the mobile terminal. This can be achieved by retrieving the IMEI (International Mobile Equipment Identity) from the memory element of the mobile terminal by calling it with a preagreed code. The missed connection attempt application is configure to deliver, by means of the communication means of the mobile terminal, the IMEI, or at least party of it indicating the type of the mobile terminal, to the network. A network element, receiving the information and being involved in the missed connection attempt notification, may comprise a database storing information on different types of mobile terminal. According to some embodiment of the invention the database comprises information on the data structure of the notification message to be used in accordance with the type of the mobile terminal. On the basis of that information the network element is configured to create the notification message so that the notification message is appropriate for the mobile terminal in question. In other words, the mobile terminal recognizes that the message is notification message on the missed connection attempts and the mobile terminal is capable of read the message and update the call register in a correct way.

Figure 2:
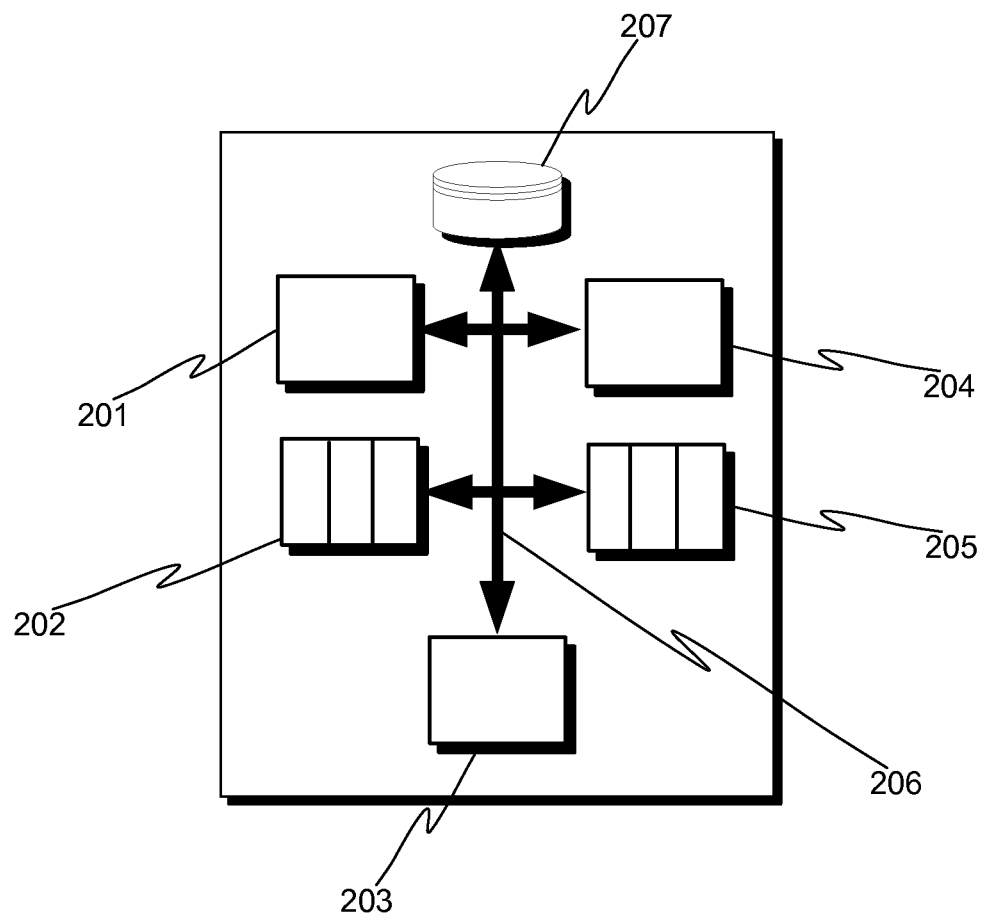
FIG. 2 illustrates a network element according to an embodiment of the invention.

FIG. 2 illustrates an example of a network element, such as a MSC, that comprises at least one processor unit 201 suitable for implementing one or more method steps as disclosed. In addition to the processor unit 201 (or Central Processor Unit; CPU) i.e. one or more processor(s), the network element may comprise network connectivity elements 202, random access memory (RAM) 203, read only memory (ROM) 204 and input/output (I/O) devices 205. The network element may further comprise a database 202 for storing at least part of information relating to the UEs or the users of the UEs utilizing the resources of a telecommunication network. These components may communicate with one another via a bus 206. In some cases, at least some of these components can locate in a single physical entity or in more than one physical entity.

The processor unit 201 is configured to execute instructions, computer programs or scripts, which can be accessed via network connectivity elements 202, or from RAM 203 or ROM 204. While only one processor is disclosed in FIG. 2, multiple processors may be present.

The network connectivity elements 202 may comprise any means for implementing wired and/or wireless connectivity of the network element, such as modems, Ethernet devices, universal serial bus (USB) interface devices, wireless local area (WLAN) devices, radio transceiver devices, such as GSM radio transceiver devices, WCDMA radio transceiver devices and/or LTE radio transceiver devices. The network connectivity elements at least enable the network element to communicate with the corresponding external telecommunication networks or Internet or other networks or any other external network element over preconfigured interfaces.

The RAM 203 can be used to store volatile data and instructions that are executed by the processor. The ROM 204 is a non-volatile memory and it is used to store instructions and perhaps data that are read during the execution of instructions. Furthermore, the memory elements 202 and 204 may be used for at least temporarily storing information on an unsuccessful connection attempt to a mobile terminal, which was detected by a processing unit of the network element.

The I/O devices 205 may include displays, touch screen displays, keyboards, keypads, switches, mice, track balls, voice recognizers, card readers, or other known I/O devices.

The database 207 may be implemented in the network element or coupled to it through the network connectivity elements 202. The database 207 may comprise at least part of the information relating to the UEs or the users of the UEs According to the invention the network element comprises software stored in the memory elements and executed by the processor unit to detect at least one unsuccessful connection attempt in the network element. Further, the network element is configured to store information on the at least one unsuccessful connection attempt at least temporarily in the network element. The network element is also configured to retrieve information from the connection attempt in the network element and to create a predetermined notification message comprising information on the at least one missed connection attempt. Furthermore, the network element is configured to initiate the delivery of the notification message in the network.

The network element may also be configured to set an indicator to indicate that the notification message comprises information on at least one missed connection attempt during the step of creating the notification message. The indicator can be defined in a transfer protocol identifier field. Furthermore, the caller of the missed connection attempt may be defined as a sender of the notification message by the network element. Alternatively or in addition the network element may be configured to insert information at least on the caller of the missed connection attempt and time of missed connection attempt in the content part of the notification message.

The network element as described may be Mobile Switching Centre, but also any other element which either directly or indirectly receives information on any connection attempts in the mobile communication network. The network element may e.g. a separate server at least partly configured to monitor if any unsuccessful connection attempts exist in the network.

Some advantageous embodiments according to the invention were described above. The invention is not limited to the embodiments described. The inventive idea can be applied in numerous ways within the scope defined by the claims attached hereto.

What is claimed is:

1. A method for notifying a user of a mobile terminal of one or more missed connection attempt in a mobile communication network, the method comprising:
   detecting at least one unsuccessful connection attempt in a network element;
   storing information on at least one unsuccessful connection attempt at least temporarily in the network element;
   retrieving information from at least one connection attempt in the network element and creating a predetermined notification message comprising information on at least one missed connection attempt in the network element,
   the creating of the predetermined notification message comprising a step of setting an indicator in a transfer protocol identifier field to indicate that the notification message includes information on at least one missed connection attempt; and
   delivering the notification message in the network.

2. The method as claimed in claim 1, wherein the creation of the notification message comprises a further step of defining the caller of the missed connection attempt as a sender of the notification message.

3. The method as claimed in claim 2, wherein a Mobile Subscriber Integrated Services Digital Network Number is used for defining the caller of the missed connection attempt as a sender of the notification message.

4. The method as claimed in claim 1, wherein information on the time of missed connection attempt is added in the notification message by a Short Message Service Centre.

5. The method as claimed in claim 4, wherein the time of missed connection attempt is expressed in a transfer protocol service centre time stamp parameter (TP-Service-Centre-Time-Stamp).

6. The method as claimed in claim 1, wherein the creation of the notification message comprises a further step of inserting information at least on the caller of the missed connection attempt and time of missed connection attempt in the content part of the notification message.

7. A network element configured to notify a user of a mobile terminal of one or more missed connection attempt in a mobile communication network, the network element comprising:
   a processor; and
   memory having computer program code recorded therein,
   the memory and the computer program code configured to, upon execution of the computer program code by the processor, cause the network element at least to
      detect at least one unsuccessful connection attempt in a network element,
      store information on at least one unsuccessful connection attempt at least temporarily in the network element,
      retrieve information from at least one connection attempt in the network element,
      create a predetermined notification message comprising information on at least one missed connection attempt in the network element, wherein an indicator is set in a transfer protocol identifier field to indicate that the notification message comprises information on at least one missed connection attempt, and
      deliver the notification message in the network.

8. The network element as claimed in claim 7, wherein the network element is configured to, during the creation of the notification message, define the caller of the missed connection attempt as a sender of the notification message.

9. The network element as claimed in claim 8, wherein the network element is configured to use a Mobile Subscriber Integrated Services Digital Network Number for defining the caller of the missed connection attempt as a sender of the notification message.

10. The network element as claimed in claim 7, wherein the network element is configured to, during the creation of the notification message, insert information at least on the caller of the missed connection attempt and time of missed connection attempt in the content part of the notification message.

11. A method for notifying a user of a mobile terminal of one or more missed connection attempt in a mobile communication network, the method comprising:
   detecting at least one unsuccessful connection attempt in a network element;
   storing information on at least one unsuccessful connection attempt at least temporarily in the network element;
   retrieving information from at least one connection attempt in the network element and creating a predetermined notification message comprising information on at least one missed connection attempt in the network element;
   and delivering the notification message in the network,
   wherein information on the time of missed connection attempt is added in the notification message by a Short Message Service Centre, and
   wherein the time of missed connection attempt is expressed in a transfer protocol service centre time stamp parameter (TP-Service-Centre-Time-Stamp).

* * * * *